US006873890B2

(12) United States Patent
Song

(10) Patent No.: US 6,873,890 B2
(45) Date of Patent: Mar. 29, 2005

(54) FREQUENCY DOMAIN SUSPENSION CONTROL SYSTEM

(75) Inventor: Xubin Song, Canton, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 0 days.

(21) Appl. No.: 10/422,603

(22) Filed: Apr. 23, 2003

(65) Prior Publication Data

US 2004/0215380 A1 Oct. 28, 2004

(51) Int. Cl.$^7$ .............................................. B60G 17/015
(52) U.S. Cl. ..................................... 701/37; 280/5.507
(58) Field of Search ............................. 701/37, 38, 39; 280/5.5, 5.506, 5.507

(56) References Cited

U.S. PATENT DOCUMENTS

| | | | | |
|---|---|---|---|---|
| 5,071,157 A | * | 12/1991 | Majeed ..................... | 280/5.515 |
| 5,231,583 A | * | 7/1993 | Lizell .......................... | 701/37 |
| 5,235,529 A | * | 8/1993 | Hanson et al. ................ | 701/37 |
| 5,467,280 A | | 11/1995 | Kimura ................ | 364/424.05 |
| 5,475,596 A | | 12/1995 | Henry et al. ........... | 364/424.05 |
| 5,510,988 A | * | 4/1996 | Majeed et al. ................ | 701/37 |
| 5,515,273 A | | 5/1996 | Sasaki et al. .......... | 364/424.05 |
| 5,563,789 A | | 10/1996 | Otterbein et al. ...... | 364/424.05 |
| 5,570,288 A | | 10/1996 | Badenoch et al. ..... | 364/424.05 |
| 5,570,289 A | | 10/1996 | Stacey et al. .......... | 364/424.05 |
| 5,606,503 A | | 2/1997 | Shal et al. ............. | 364/423.098 |
| 5,692,587 A | * | 12/1997 | Fratini, Jr. ............... | 188/266.2 |
| 5,732,370 A | | 3/1998 | Boyle et al. .................. | 701/37 |
| 5,864,768 A | | 1/1999 | Bieber et al. ................. | 701/38 |
| 5,890,081 A | | 3/1999 | Sasaki .......................... | 701/37 |
| 5,928,297 A | | 7/1999 | Murata et al. ................ | 701/37 |
| 5,935,181 A | | 8/1999 | Iwasaki ....................... | 701/37 |
| 5,983,150 A | | 11/1999 | Sasaki ......................... | 701/48 |
| 6,000,702 A | | 12/1999 | Streiter ..................... | 280/5.507 |
| 6,290,034 B1 | | 9/2001 | Ichimaru .................. | 188/299.1 |
| 6,366,841 B1 | * | 4/2002 | Ohsaku ........................ | 701/37 |
| 6,438,473 B1 | | 8/2002 | Barta et al. ................... | 701/37 |
| 6,456,912 B1 | | 9/2002 | Raynauld et al. ............. | 701/37 |
| 2002/0032508 A1 | | 3/2002 | Uchino et al. ................ | 701/37 |
| 2002/0143448 A1 | | 10/2002 | Shal et al. .................... | 701/37 |
| 2002/0161498 A1 | | 10/2002 | Stiller et al. .................. | 701/37 |
| 2004/0153226 A1 | * | 8/2004 | Song ........................... | 701/37 |

OTHER PUBLICATIONS

"Hearing Damage and Loud Music," http://www.abelard.org/hear/hear.htm, pp. 1–11, printed on Mar. 19, 2003.
"Preventing Hearing Damage When Listening With Headphones (*A Headwize Headphone Guide*)," Headwize Article & Multimedia Library, http://headwize2.powerpill.org/articles/hearing_art.htm, pp. 1–9, printed on Apr. 23, 2003.
Goncalves, Fernando D., Ahmadian, Mehdi, "A Hybrid Control Policy for Semi–Active Vehicle Suspension," *Advanced Vehicle Dynamics Laboratory Department for Mechanical Engineering*, Virginia Tech, Blacksburg, VA 24061.
Song, Xubin, "Design of Adaptive Vibration Control Systems with Application of Magneto–Rheological Dampers," *Virginia Polytechnic Institute and State University*, Blacksburg, Virginia, Feb., 1999.

* cited by examiner

*Primary Examiner*—Gary Chin
(74) *Attorney, Agent, or Firm*—Brinks Hofer Gilson and Lione

(57) ABSTRACT

A controller is operative to: receive vehicle body accelerations from a vehicle; use the body accelerations to calculate heave, pitch and roll (HPR) dynamic signals based on the received body accelerations; select frequency ranges based on the HPR dynamic signals (and/or other vehicle dynamic signals) to be controlled; calculate a combined control strategy based on the selected frequency ranges; and adjust a damper of the vehicle based on the control strategy.

15 Claims, 9 Drawing Sheets

FIG. 2
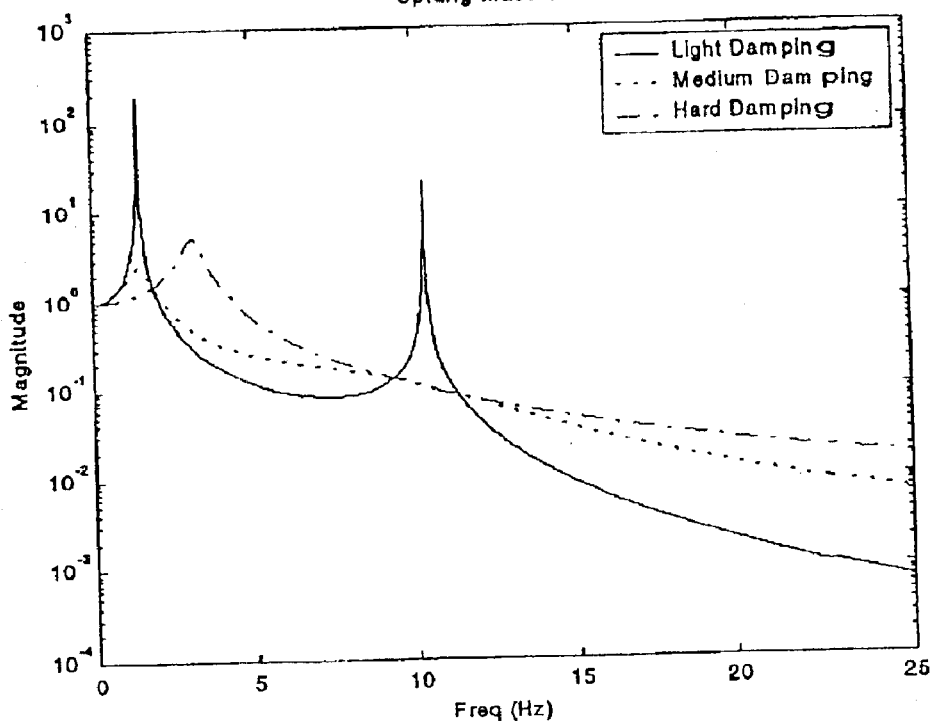
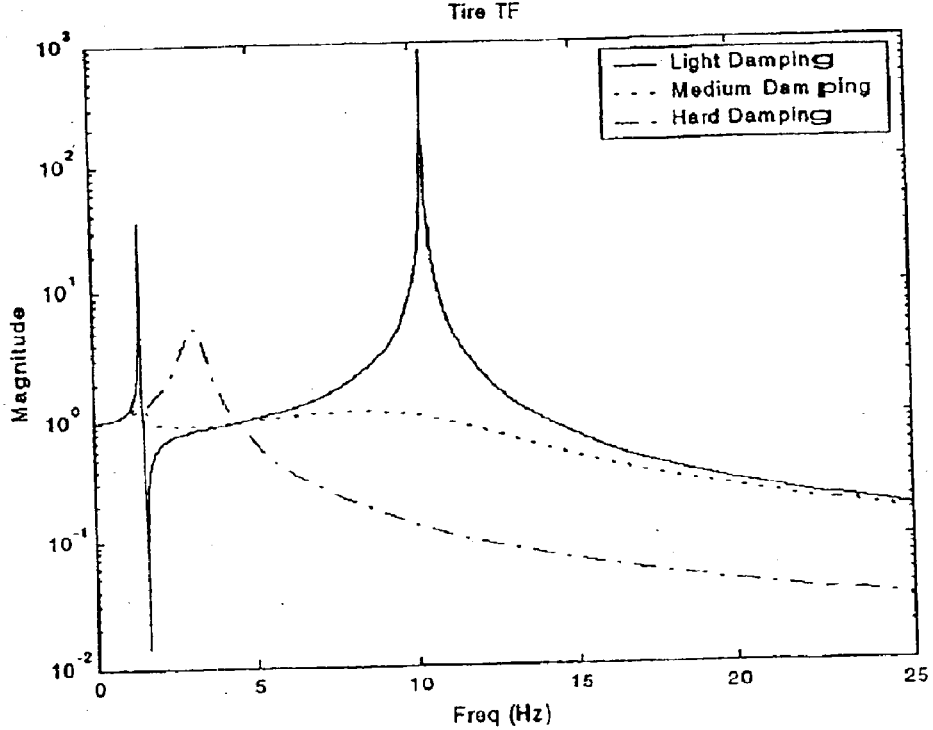
FIG. 3

FIG. 11
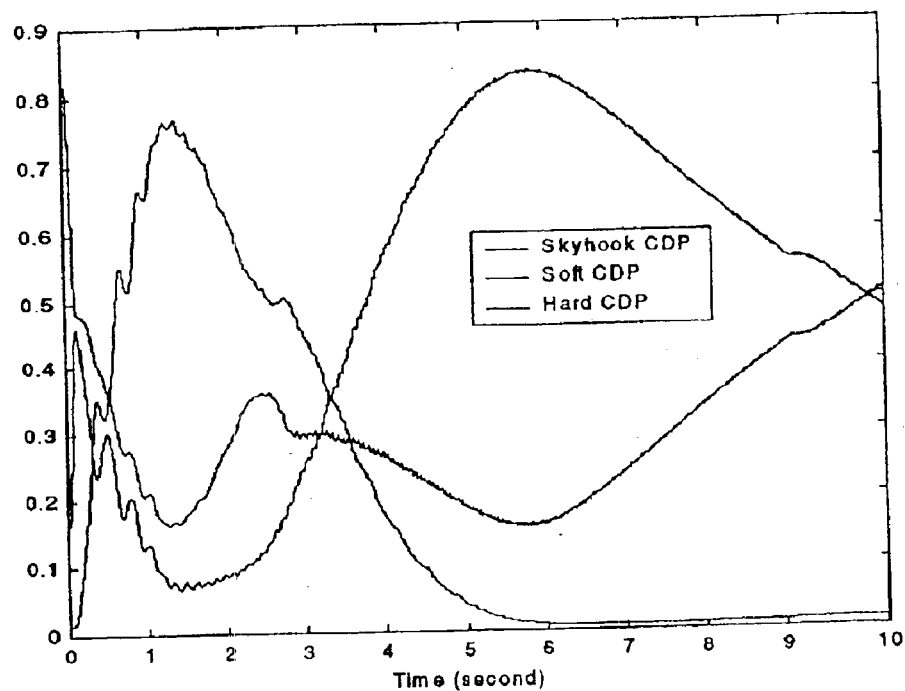
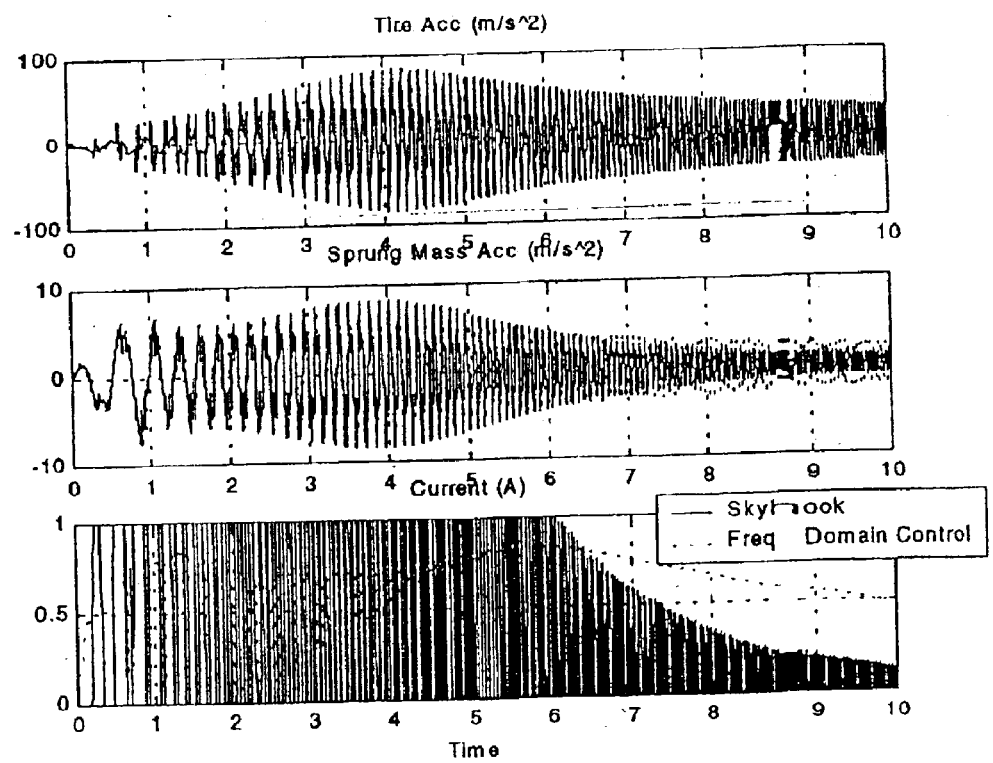
FIG.12

FIG. 13
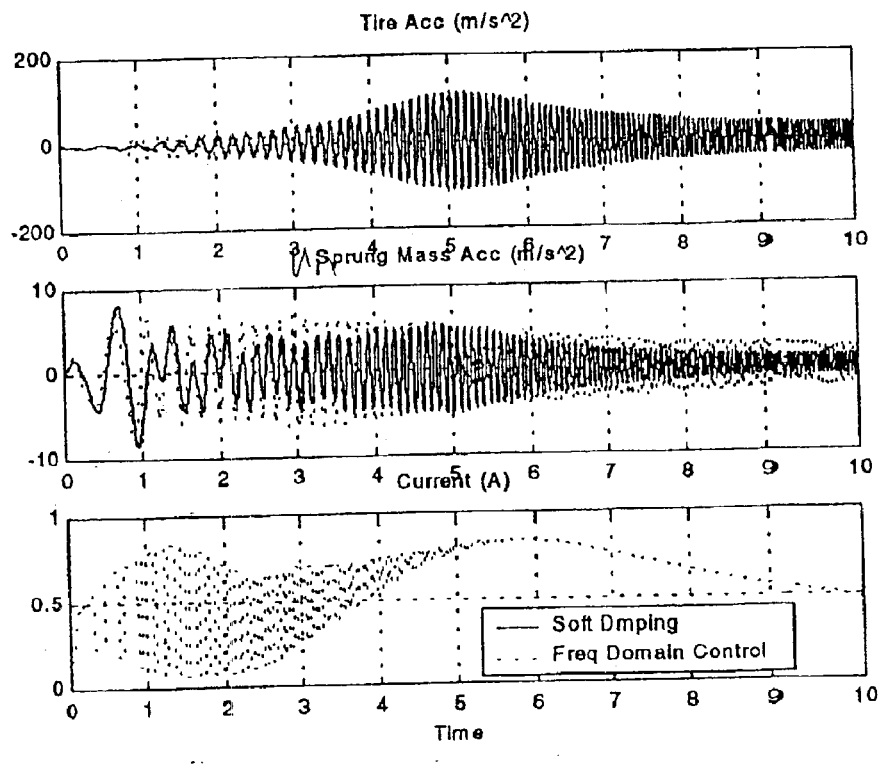
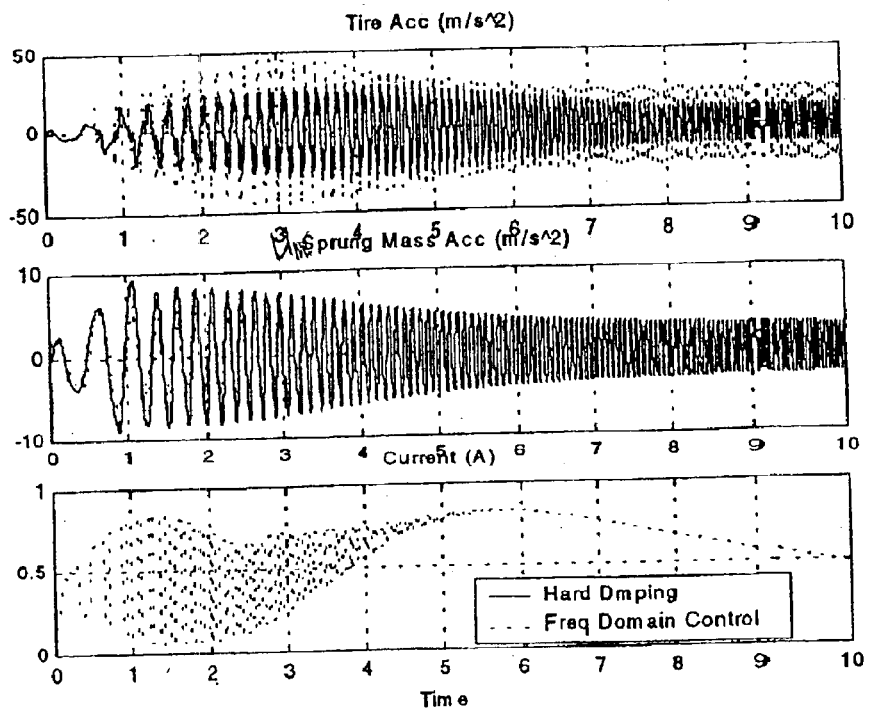
FIG. 14

FREQUENCY DOMAIN SUSPENSION CONTROL SYSTEM

FIELD OF INVENTION

This invention relates generally to the field of vehicle suspension control systems. More particularly, this invention relates to utilizing frequency domain information to control the vehicle suspension system.

BACKGROUND

Generally, people all over the world drive their automobiles to various destinations. In order for these people to enjoy the ride to their destinations the suspensions systems in the automobiles must be stable and as comfortable as possible. Typically, different types of automobiles have various suspension systems, which control the ride and handling performance of the vehicle. For example, some vehicles may have a stiff suspension system that improves its handling performance, but it may provide them with an uncomfortable ride. In contrast to the stiff suspension system, some vehicles may have a soft suspension system that provides a comfortable ride, but the handling performance of this suspension system may be unbearable.

These suspension systems also include various components, such as shock absorbers. Shock absorbers receive and take up shock that would normally be exerted on the wheels of the vehicle in order to improve the ride performance and the vibration of the wheels. The vibration of the wheels triggers the suspension system to vibrate in an uncontrollable manner. The suspension system vibrates at different frequencies, which may make the suspension system unstable and arduous to control. The previously described control strategies for the suspension systems provide performance trade-off control among different mode frequencies. However, one control strategy cannot be applied to all shock absorbers to control the vibration of the different suspension systems at different frequencies.

For example, a quarter portion 101 of a known vehicle is schematically shown in FIG. 1. FIG. 1 illustrates a block diagram of the suspension system associated with a quarter portion of the vehicle body 100. Note that discussion that follows is equally applicable to the suspension systems associated with the other three portions of the vehicle. This portion 101 includes the following components: an unsprung mass 103, sprung mass 105, a spring 107 and the damper 409 (FIG. 4). These components may be connected to each other in any suitable combination. Unsprung mass 103 represents wheel 425, brake assemblies (not shown) in vehicle 400, a rear axle assembly (not shown) and other structural members not supported by the vehicle 400 (FIG. 4). Sprung mass 105 includes all the components of vehicle 400 that are supported by the suspension system of the vehicle 400.

Turning to the operation of this portion 101 of FIG. 2, as the wheel 425 traverses over a surface 111 this wheel 425 tends to vibrate. This vibration of the wheel 425 is transmitted through the suspension system of the vehicle 400 to the sprung mass 105 and unsprung mass 103. FIGS. 2 and 3 graphically illustrate the effects of a driver applying different control strategies to the suspension system of a quarter portion 101 (FIG. 1) of a vehicle. The control strategies include a light damping procedure, a hard damping procedure and a medium damping procedure. Light damping, hard damping and medium damping refers to the level of ride performance experienced by a driver in a vehicle. For example, hard damping in FIGS. 2 and 3 refer to applying a strong force to the wheels of the vehicle to stabilize them. Specifically, these figures depict the effects of light damping, medium damping and hard damping on the sprung mass components (dynamics) at a sprung mass mode of around 1.2 Hz and unsprung mass dynamics at an unpsrung mass mode of around 12 Hz, while the magnitude is indicative of the transmissibility gain or ratio. For example, in FIG. 2, when a driver applies a hard damping procedure to the vehicle 400, then the sprung mass components in the vehicle 400 have a well-controlled ride performance around the sprung-mass frequency range. In contrast to the stability of a driver applying the hard damping procedure to the vehicle 400, when the driver applies a light or medium damping procedure to the vehicle 400 the sprung mass dynamics become unstable and they can experience large vibrations near the sprung-mass mode frequency.

In FIG. 3 a driver employs a medium damping procedure to the quarter portion 101 of vehicle 100 to keep the unsprung mass components' of the vehicle 100 from fluctuating and this procedure keeps the unsprung mass dynamics well controlled. When the driver applies a light or hard damping procedure to the unsprung mass dynamics, then there will be instability in these dynamics of the vehicle. In addition, the unsprung mass dynamics may experience large vibrations. Unsprung mass dynamics and sprung mass dynamics exhibit different dynamic characteristics under different optimum damping levels corresponding to different frequencies to minimize the vibration of the unsprung mass dynamics and sprung mass dynamics, which stabilize and achieve a good ride performance of the vehicle. These figures show that one control strategy cannot be applied to all suspensions systems to control their vibration at different frequencies.

Accordingly, there is a need for a method and apparatus that enables a driver to improve the ride performance of the vehicle by stabilizing the vibration of the suspension system at any frequency.

BRIEF SUMMARY

One aspect of the present invention provides a frequency domain suspension control system. The system includes a controller, an accelerometer and a damper. The accelerometer is coupled to the controller, where the accelerometer is operative to transmit a body acceleration to the controller. The damper is coupled to the controller and a vehicle. The controller is operative to: receive the body acceleration, calculate a heave, pitch and roll dynamic signals in response to receiving the body acceleration for the damper: select frequency ranges based on the heave, pitch and roll dynamic signals and/or other dynamic signals to be controlled: calculate a combined control strategy based on the selected frequency ranges: and adjust the damper of the vehicle based on the combined control strategy.

Another aspect of the present invention provides a method for utilizing frequency domain information to control a vehicle suspension system. A body acceleration is received from a vehicle. Heave, pitch and roll (HPR) dynamic signals are calculated based on the received body acceleration. Frequency domain information for each selected frequency range is selected based on the HPR dynamic signals. A control distribution parameter for each selected frequency range is calculated based on the selected frequency range. A combined control strategy is calculated based on the control distribution parameter. A damper of the vehicle is adjusted based on the combined control strategy.

Yet another aspect of the present invention provides a method for controlling a sound signal emitted from a noise device. A sound signal is received. Frequency ranges are selected based on the received sound signal. A control distribution parameter is calculated based on the selected frequency ranges. A combined control strategy is calculated based on the control distribution parameter. The sound signal is adjusted based on the combined control strategy.

The aforementioned aspects of the present invention provide the advantage of enabling a vehicle to provide a good and stable ride and handling performance when its suspension system vibrates at any frequency as it traverses any surface. In addition, one of the aforementioned inventions provides an apparatus to reduce the sound emitted from a device.

These and other advantages of the present invention will become more fully apparent as the following description is read in conjunction with the accompanying drawings.

BRIEF DESCRIPTION OF THE DRAWINGS

FIG. 2 depicts a graphical illustration of sprung mass transmissibility of the quarter portion of FIG. 1 using different known control strategies;

FIG. 3 depicts a graphical illustration of an unsprung mass transmissibility of the quarter portion of FIG. 1 using different known control strategies;

FIG. 11 depicts a graphical illustration of a control distribution parameter according to the present invention;

FIG. 12 depicts a graphical illustration of a comparison of a frequency domain control and a skyhook procedure over time versus tire acceleration, sprung mass acceleration and current according to the present invention;

FIG. 13 depicts a graphical illustration of a comparison of a frequency domain control and a soft damping procedure over time versus tire acceleration, sprung mass acceleration and current according to the present invention; and FIG. 14 depicts a graphical illustration of a comparison of a frequency domain control and a hard damping procedure versus tire acceleration, sprung mass acceleration and current according to the present invention.

DETAILED DESCRIPTION OF THE PRESENT INVENTION

Figure 4:
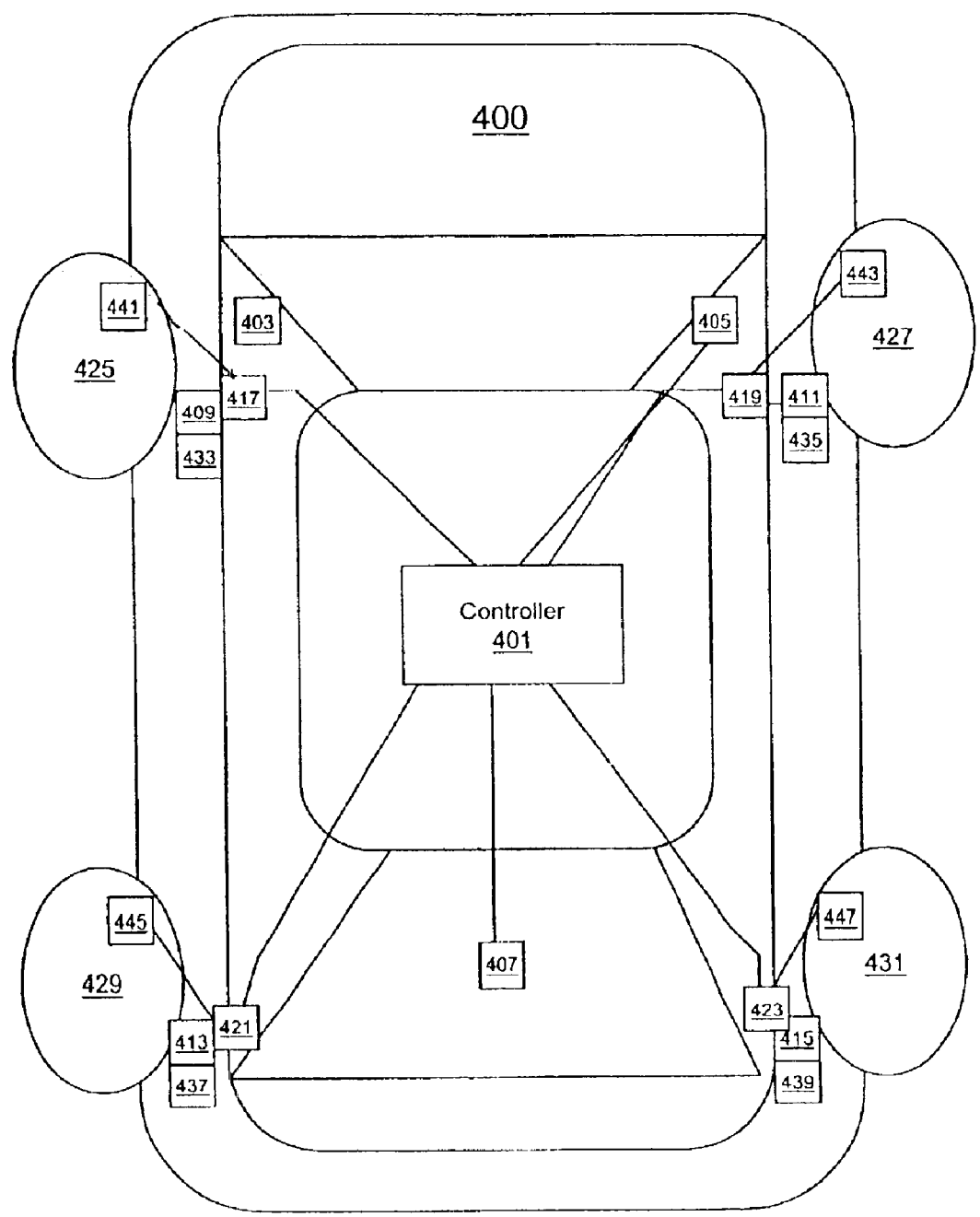
FIG. 4 schematically illustrates a vehicle that includes a controller and sensors according to the present invention.

As shown in FIG. 4, vehicle body 400 includes: a controller 401, accelerometers 403, 405 and 407 (403–407), dampers 409, 411, 413 and 415 (409–415), power electronics 417, 419, 421 and 423 (417–423), wheels 425, 427, 429 and 434 (425–431), damper sensors 433, 435, 437 and 439 (433–439) and the typical components associated with a vehicle. Controller 401 is coupled to accelerometers 403–407, damper sensors 433–439 and power electronics 417–423. Accelerometers 403 and 405 are located close to respective wheels 425 and 427. Accelerometer 407 is located in a back portion of vehicle 400. Power electronics 417–423 are coupled to the dampers 409–415, respectively. Dampers 409–415 are further coupled to the respective wheels 425–431. A cable, wire connection or any type of connection used to connect electrical devices couples the controller 401 to the accelerometers 403–407, power electronics 417–423 and dampers 409–415, which include damper sensors 433–439. In addition, the cable or wire connection couples the dampers 409–415 to the respective wheels 425–431.

Turning to the operation of the controller 401, it receives vehicle body accelerations from accelerometers/sensors 403, 405 and 407 (403–407) on the vehicle body. In addition, the controller 401 receives damper sensor measurements from damper sensors 433–439. These body accelerations are converted to heave, pitch and roll accelerations or measured dynamic signals. Heave is a vertical acceleration calculated from the center of gravity of the vehicle body 400 where positive heave acceleration is directed downward. Pitch is the angular acceleration of vehicle 400 measured in rad/s$^2$ where the positive pitch acceleration is calculated at the front of the vehicle body 400 being directed upward. Roll is the angular acceleration of the vehicle 400 measured in rad/s$^2$ where the positive roll acceleration is at the left side of the vehicle body 400 being directed upward.

Figure 6:
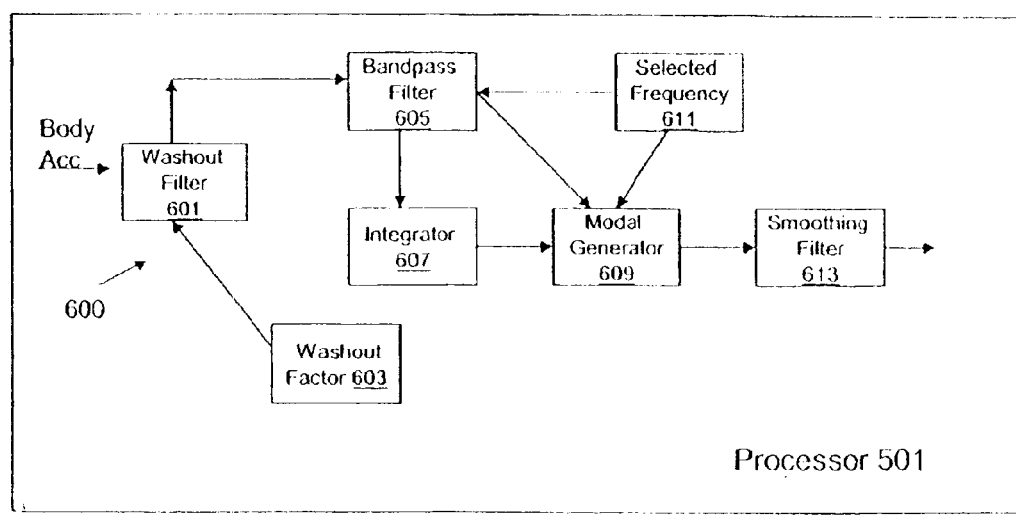
FIG. 6 depicts a block diagram of an embodiment of a control system for obtaining an amplitude according to the present invention.

Controller 401 uses the aforementioned accelerations from accelerometers 403–407 in a control system described in FIG. 6 to control the suspension system of vehicle 400. For example, when the controller 401 employs the control system of FIG. 6 it enables the shock absorbers or dampers 409–415 to move and control or reduce the vibration of wheels 425–431, which controls the stability of the suspension system of vehicle 400.

Figure 1:
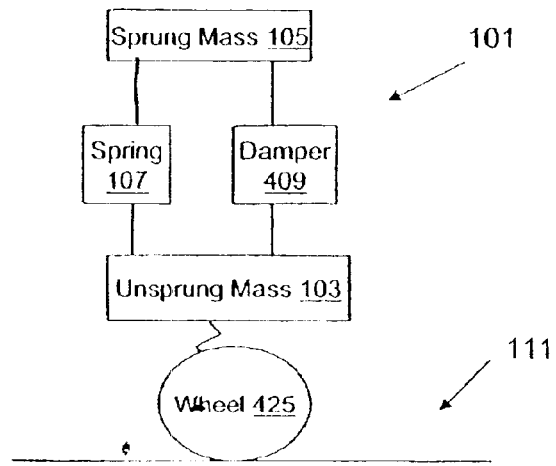
FIG. 1 schematically illustrates a model that simulates various forces acting on a quarter portion of a known vehicle.

An algorithm of FIG. 6 in processor 501 (FIG. 5) in controller 401 (FIG. 4) is applied to the model shown in FIG. 1 to reduce the vibration on the sprung mass 105 components of the vehicle. In addition, this controller 401 reduces a force variation from the vibrated wheel 425 on the unsprung mass 103, which strengthens the handling performance of the vehicle 400 and reduces wear and tear on wheel 425 or wheels 427–431.

Figure 5:
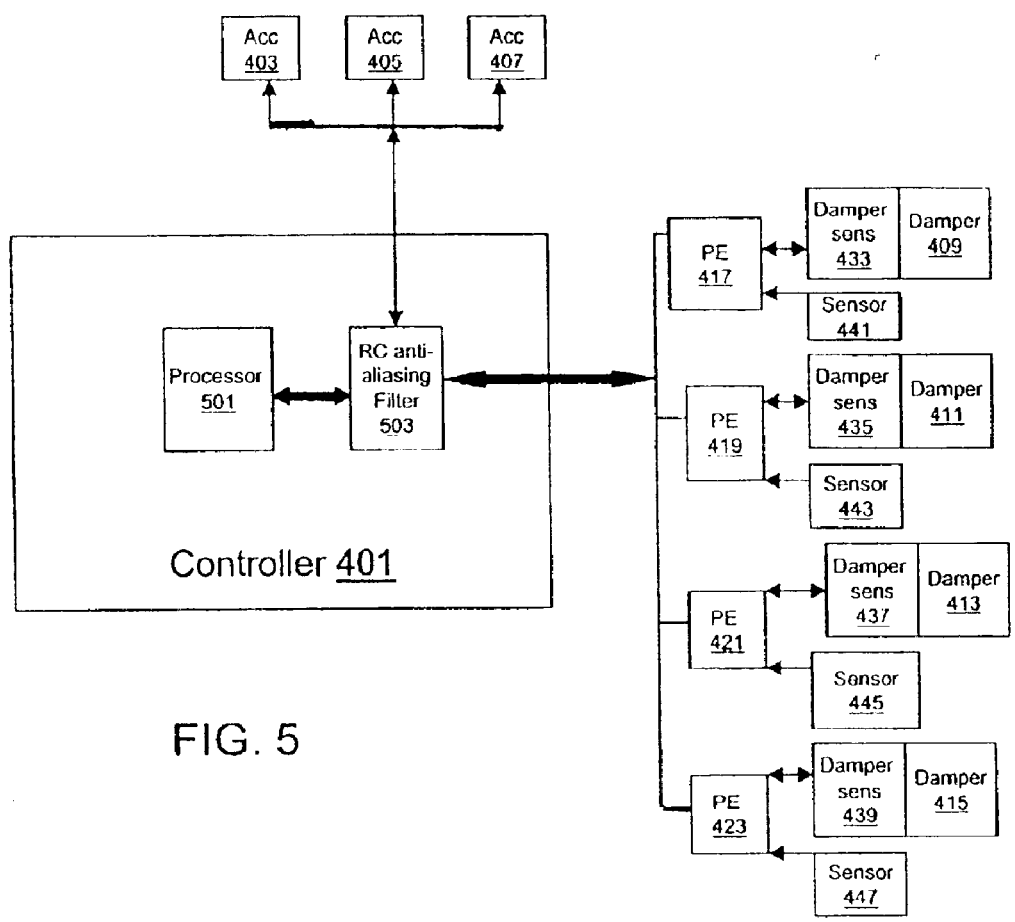
FIG. 5 schematically illustrates an embodiment of the controller, sensors and dampers used with the vehicle of FIG. 4 according to the present invention.

As shown in FIG. 5, controller 401 receives body accelerations from accelerometers 403–407 on the body of the vehicle 400. Controller 401 also receives damper sensor measurements from damper sensors 433–439. When the controller 401 receives these body accelerations and damper sensor measurements it inputs them into a processor 501. Processor 501 transforms the body accelerations by a known method to heave, pitch and roll (HPR) dynamic signals. These HPR signals enable the controller 401 to be in command of the suspension of the vehicle 400. In addition, processor 501 includes the algorithm, described in FIG. 6, which uses the body accelerations and damper sensor measurements to adjust dampers 409–415 to control the suspension of the vehicle 400. Further, controller 401 uses a software algorithm to implement a control strategy to manage the suspension of vehicle 400.

Turning to the components of controller 401, it includes the processor 501 and a typical RC anti-aliasing filter 503 as shown in FIG. 5. This RC anti-aliasing filter 503 is a known filter that improves the sensing information from accelerometers 403–407 and damper sensors 433–439 before their signals are converted from analog to digital signals at processor 501. When processor 501 receives the signals from the RC anti-aliasing filter 503 it converts them to digital signals, then the processor 501 inputs these signals into the algorithm of FIG. 6 and the frequency domain suspension control algorithm further described below to adjust the movement of dampers 409, 411, 413 and 415. Processor 501 utilizes the body accelerations with the algorithm of FIG. 6 to formulate proper commands transmitted to the power electronics 417, 419, 421 and 423 (417–423) to control the dampers 409–415. The dampers 409–415 are utilized by processor 501 to control and/or reduce the vibration of wheels 425–431 to stabilize the suspension system of the vehicle 400.

Processor 501 may have many forms, for example, processor 501 can be implemented as a hardware device integrated with the algorithm of FIG. 6 and a software algorithm described below. Preferably, this hardware device includes microprocessors, micro-controllers, or digital signal processors, having an electronic erasable program read only memory (EEPROM) or Flash memory, static random access memory (RAM), a clocking/timing circuit, or any typical processor utilized in an electrical device. The software algorithm in processor 501 enables this processor to continuously monitor and read signals from accelerometers 403–407 and damper sensors 433–439. In addition, this software algorithm includes equations discussed below. Processor 501 transmits pulse width modulated signals to power electronics 417–423 of FIG. 4 to adjust the dampers 409–415. Dampers 409–415 control the suspension of the vehicle 400. Processor 501 is coupled to the power electronics 417–423.

Power electronics 417–423 receive commands from processor 501 to move dampers 409–415 to control the suspension of the vehicle 400. The power electronics 417–423 include the typical components utilized to drive a circuit. Preferably, the power electronics 417–423 include four-closed loop current controllers (or solenoid valves) or stepper motor drivers to move the dampers 409–415, which control the suspension of the vehicle 400.

Next to the wheels 425–431 are dampers 409, 411, 413 and 415 (409–415), which include typical damper sensors 433–439. Dampers 409–415 receive commands or instructions from the power electronics 417–423 to control the suspension of the vehicle 400. Damper sensors 433–439 are typical damper sensors that measure the amount of pressure received or exerted by dampers 409–415 and any other measurements associated with the dampers. Dampers are also known as shock absorbers. Shock absorbers receive and take up shock that would normally be exerted on the wheels of a vehicle in order to improve ride performance. There are different types of shock absorbers such as multi-stage shock absorbers and continuously variable shock absorbers. The multi-stage shock absorbers have three settings: soft, firm and intermediate settings, which indicate the level of vehicle ride performance experienced by the passengers. Continuously variable shock absorbers or continuously variable dampers have a large number of settings between soft and firm. In addition, some continuously variable shock absorbers may be referred to as "skyhook dampers", because the shock absorbers simplify the implementation of a control system that controls a ride base on the skyhook theory.

FIG. 6 depicts a block diagram of deriving an amplitude for a selected frequency range. This amplitude from the algorithm 600 is stored on processor 501 (FIG. 5). As described above processor 501 receives sensor signals that are converted to heave, pitch and roll (HPR) accelerations or HPR dynamic signals, and/or damper measurements or damper/actuator signals from damper/actuator sensors 433–439

A first portion of the algorithm 600 includes a washout filter block 601 that receives the heave, pitch and roll (HPR) dynamic signals transformed from accelerometers 403–407 and/or damper/actuator signals from damper/actuator sensors 433–439. In addition, the washout filter block 601 receives a tuning signal from a washout factor block 603 as a tuning parameter. Preferably, the tuning signal has a frequency below 0.1 Hz. The washout filter block 601 is a separate high pass filter applied to each of the heave, pitch and roll (HPR) dynamic signals to remove low frequency components including DC (direct current) components, such as frequencies below 0.1 Hz to remove signal bias or drift from each measured dynamic signal.

When the HPR dynamic signals and/or actuator signals are transmitted through the washout filter block 601, then these signals are transmitted to a bandpass filter block 605. This bandpass filter block 605 allows signals between two specific frequencies to pass for each of the following modes: a sprung mass mode, an unsprung mass mode and a hybrid mode that is selected between the sprung mass mode and unsprung mass mode. For example 1.0–1.5 Hz for the sprung mass mode, 10–12 Hz for the unsprung mass mode and 4.5 Hz to 5.5 Hz for the hybrid mode. This bandpass filter block 605 discriminates against signals at other frequencies.

This bandpass filter block 605 also receives three selected frequencies (i.e., sprung mass mode, unsprung mass mode and hybrid mode) from selected frequency block 611 with constant values. The frequencies from the selected frequency block 611 can be a frequency $N_1$ of 1–1.5 Hz for a sprung mass mode, frequency $N_2$ 10–12 Hz for an unsprung mass mode and a frequency $N_3$ of 4–8 Hz for a hybrid mode. Preferably, the hybrid mode frequency between the sprung mass mode and the unsprung mass mode is 5.6 Hz. In an alterative embodiment, the sprung mass mode, unsprung mass mode and hybrid mode have multiple frequency ranges. Each of the aforementioned frequency ranges is part of a whole frequency domain. The frequency information for each of the frequency ranges is based on the HPR dynamic signals that have a specific bandpass (BP) filter used in bandpass filter block 605, which is designed according to the following equation:

$$BP_j(s) = \frac{a_j s}{s^2 + a_j s + b_j}$$

where a and b are properly selected values used to represent the interested frequencies from selected frequency block 611 and j=1, 2, 3 that represents the sprung mass mode, unsprung mode and hybrid mode, respectively. For example, $b_j=(2\pi N_j)^2$, and $a_j=2*\text{coef}_j*(2\pi N_j)$, where coef or coefficient is a properly selected value, which is smaller than 1, dependent on a specific situation. The s value is an operating symbol for describing the above equation in the frequency domain and it is an operating symbol for transfer functions. This $BP_j$ equation is a typical equation for a bandpass filter and the selection of a, b are well known given frequency $N_j$.

Figure 9:
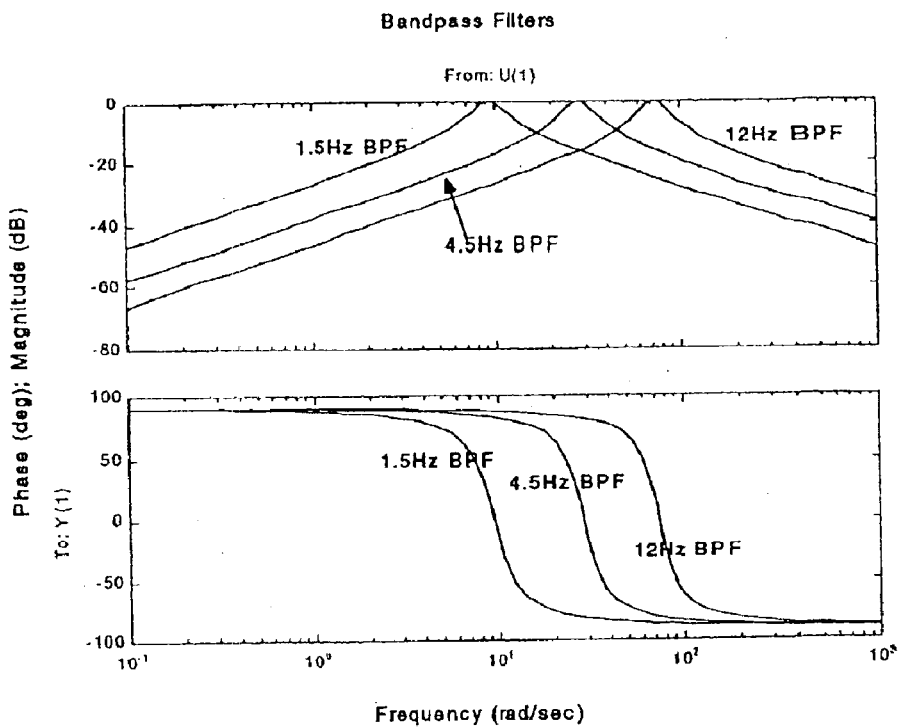
FIG. 9 depicts a graphical illustration of bandpass filters for sprung mass mode, unsprung mass mode and a hybrid between the sprung mass mode and unsprung mass mode versus phase and magnitude according to the present invention.

Turning to FIG. 9, the bandpass filter block 605 employing $BP_j$ is depicted in a graphical illustration for three frequency ranges for sprung mass mode, unsprung mass mode and hybrid mode. The bandpass filter frequency 1.5 Hz represents the frequency of sprung mass mode components, bandpass filter frequency 4.5 Hz represents the frequency for the hybrid mode components and bandpass filter frequency 12 Hz represents unsprung mass mode components. As these bandpass filters in the bandpass filter block 605 receive the dynamic signals from the washout filter block 601, the signals are filtered, and dominant frequency domain information is extracted based on a sprung mass mode selected frequency of 1.5 Hz, unsprung mass mode selected frequency of 12 Hz and hybrid frequency of 4.5 Hz. Theoretically, bandpass filters encompass frequency ranges from 0 to infinity hertz, but vehicle suspension system encompasses the frequency ranges of 0 to 30 Hz.

Referring to FIG. 6, when the dynamic signals pass through the bandpass filter block 605, then these filtered dynamic signals or frequency range signals are transmitted to the integrator block 607 and a selected-frequency-dependent modal generator block (modal generator block) 609. At the integrator block 607, each of the three heave accelerations in three frequency ranges are integrated to yield a heave integrated value. Integrator block 607 similarly yields three integrated values for the pitch and roll accelerations, respectively.

Turning to the modal generator block 609, it receives the measured dynamic signals from the bandpass filter block 605, an integrated value for heave, pitch and roll from the integrator block 607 and the selected frequencies from the frequency block 611. The modal generator block 609 uses the received information to create frequency information ($\Psi_{ij}$), for example, according to the following equation:

$$\Psi_{ij} = [(j^{th} \text{ heave acceleration}/(2\pi N_j))^2 + (j^{th} \text{ heave integrated acceleration}^2)]^{1/2}$$

The pitch and roll accelerations are utilized in a similar manner to create frequency information $\Psi_{ij}$ (i=1 (for heave), 2, (pitch), 3 (roll) and j represents the various modes or frequency ranges (as stated above) for their modes in the modal generator block 609. The values for $\Psi_{ij}$ for each mode are transmitted to the smoothing filter block 613 where the frequency information is filtered out by the smoothing filter block 603 to obtain amplitude (A) signals by applying a low-pass filter to the amplitude.

Smoothing filter block 613 is a separate low pass filter applied to each of the amplitude signals to remove high frequency components from each of the amplitude signals where frequencies above 0.1 Hz are extracted from the amplitude signals. For each measured dynamic signal there are a number of Amplitude signals that are equal to the number of the selected frequencies. Thus, there are nine amplitude signals in total for the measured dynamic signals, such as three amplitude signals for a heave measured dynamic signal, three amplitude signals for a pitch measured dynamic signal and three amplitude signals for a roll measured dynamic signal. Heave, pitch and roll each include a frequency range for sprung mass mode, unsprung mass and hybrid between sprung mass and unsprung mass described above.

For example, each of the nine amplitude signals is represented by $A_{ij}$ (i=1, 2, 3, j=1, 2, 3). As previously stated each heave, pitch and roll includes a sprung mass mode, hybrid mode and unsprung mass mode denoted respectively by numerals 1, 2 and 3. The heave pitch and roll amplitude signals are outputted from the processor 501 in the controller 401, the controller employs the value of each amplitude signal $A_{ij}$ in equations stored in a software algorithm on the microprocessor 501. For example, the amplitude is used by the microprocessor 501 to obtain a control distribution parameter (CDP) according to the following equation:

$$CDP\ \lambda_{ij} = \frac{A_{ij}}{\varepsilon + \sum_{j=1}^{3} A_{ij}}$$

where $\varepsilon$ is a very small value, such as one hundredth (0.01) or one thousandth (0.001) or smaller and it is used to avoid numerical singularity. The value j, as previously stated, represents a frequency associated with a sprung mass mode, hybrid mode or unsprung mass mode from the selected frequency ranges from the selected frequency block 611. $A_{ij}$ represents the amplitude signal for each selected frequency in the selected frequency block 611.

After the CDP is calculated, then the control strategy is determined for each measured dynamic signal (heave, pitch, and roll) according to the following equation:

$$\text{Control} = \sum_{i=1}^{3} \sum_{j=1}^{3} (\lambda_{ij} \cdot \text{Strategy}(i, j))$$

where j represents a frequency, described above, from the selected frequency ranges from the selected frequency block 611, where $\lambda_{ij}$ represents the control distribution parameters, where i represents heave, pitch and roll. Each frequency in the selected frequency block has a predetermined control strategy, which is utilized by this combined controlled strategy equation. For example, when the i=1 is a 1.5 Hz frequency for a heave acceleration or measured dynamic signal then the control strategy may be a skyhook damping procedure.

The value of strategy (i,j) represents a typical specific control strategy that can most effectively control the dynamics for the selected $j^{th}$ frequency range of the $i^{th}$ dynamic signal (i.e., Heave, Pith, and Roll). The control and control distribution parameters must be applied to heave, pitch and roll independently. For example, the following equations are utilized to calculate the heave, pitch and roll control as follows:

Heave Control: Control(1)=sum[CDP(1,j)*HeaveStrategy(1,j)],

Pitch Control: Control(2)=sum[CDP(2,j)*PitchStrategy(2,j)], and

Roll Control: Control(3)=sum[CDP(3,j)*RollStrategy(3,j)].

Thus, the total control signal is Control=sum[Control(i)], where i is from 1 to 3.

Turning to the Strategy (i,j) of the aforementioned control equation, these strategies can be typical soft/hard damping procedures, typical skyhook/groundhook procedures, typical soft/hard stiffness procedures etc. This strategy selection for Strategy (i,j) is based on a known specific dynamic control system depending on the vehicle. The control can provide the dominant strategy(i,j) control or trade off among strategies dependent on the value of the control distribution parameter or $\lambda_{ij}$. The aforementioned strategies are typical procedures, which adjust dampers 409–415 in a vehicle. Finally, the controls determined by the above approach for heave, pitch and roll are combined together by simply using summation or other approaches such as fuzzy logic. These procedures are combined in a summation or by fuzzy logic to stabilize the unsprung mass components, sprung mass components and between unsprung mass components and sprung mass components as the vehicle traverse a surface. Typically, fuzzy logic refers to an approach to computing based on "degrees of truth" rather than the usual "true or false" or Boolean logic on which the modern computer is based on.

When this combined control strategy is determined, then a signal is transmitted from the controller 401 to the power electronics 417–423, which make the actuators/dampers 409–415 move to control the suspension of the vehicle 400 or wheels 425–431. Preferably, the power electronics 417–423 are four closed loop current controllers (or solenoid valves) or stepper motor drivers or other kinds of actuators, the outputs of which will adjust each respective actuator/damper 409–415.

Figure 7:
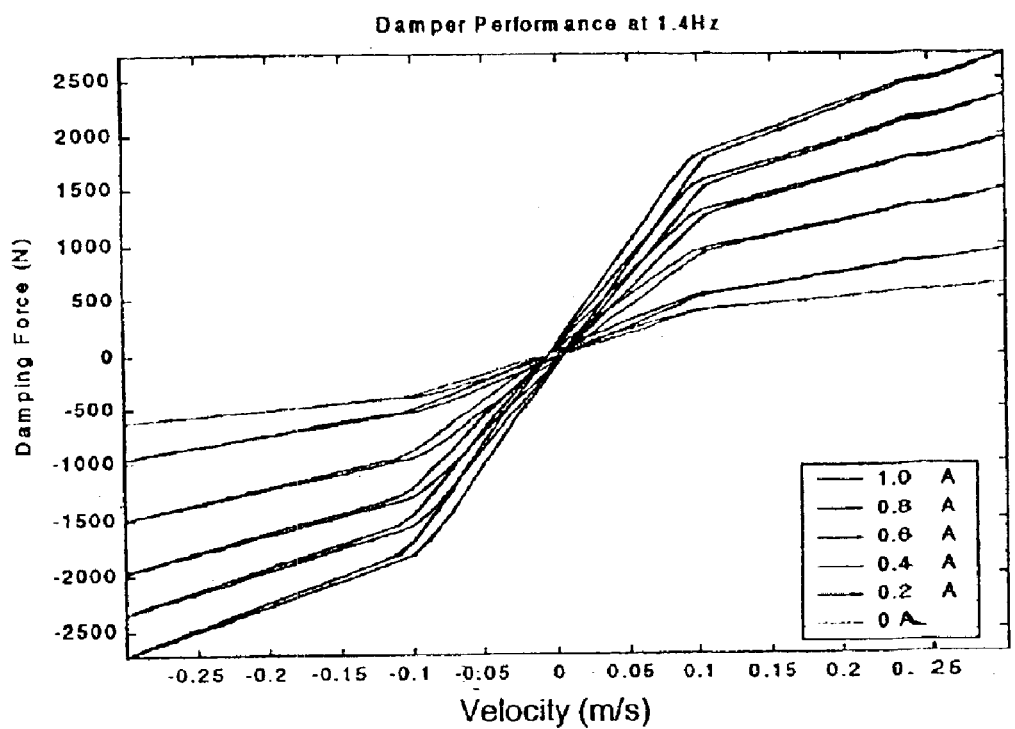
FIG. 7 depicts a graphical illustration of a damping performance of the quarter portion of FIG. 1 as the vehicle vibrates at 1.4 hz according to the present invention.
Figure 8:
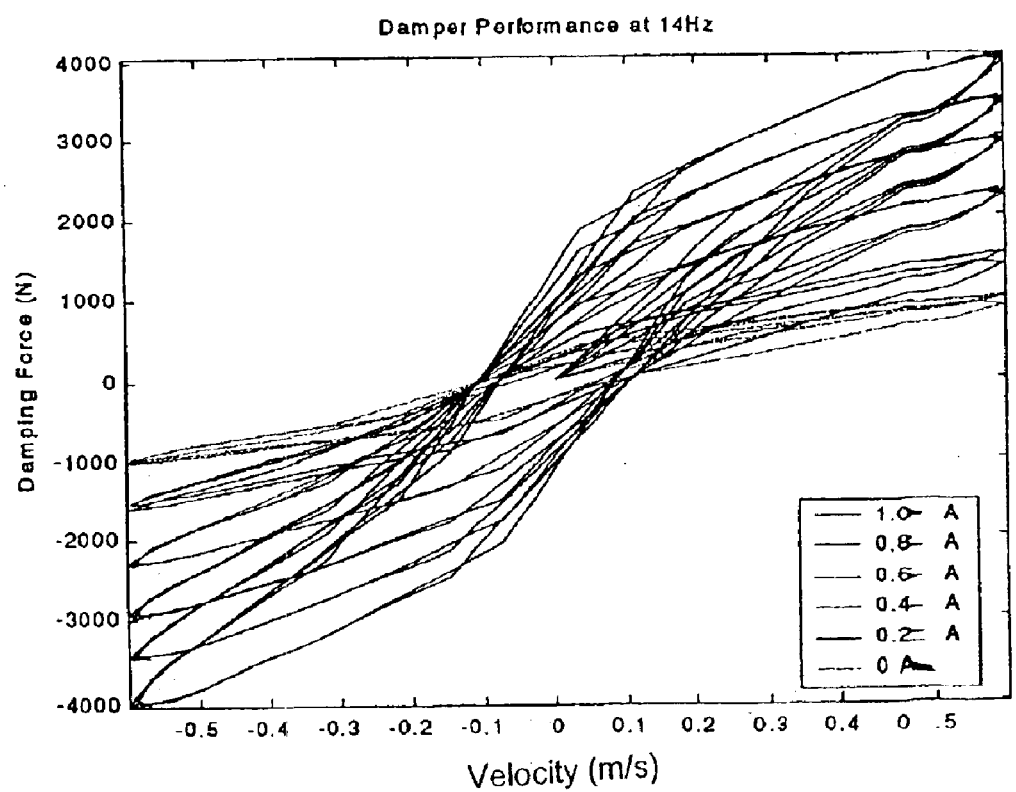
FIG. 8 depicts a graphical illustration of a damping performance of the quarter portion of FIG. 1 as the vehicle vibrates at 14 hz according to the present invention.

The operation of the controller 401 with the quarter portion 101 for various damping procedures or control strategies are depicted in the following figures. For example, FIGS. 7 and 8 depict graphical illustrations of a damping performance of the quarter portion 101 of FIG. 1 when aspects of the present invention are applied. These illustrations depict the amount of force applied to the damper 409 at 1.4 Hz and 14 Hz as the suspension relative velocity increases from 0 m/s to 0.5 m/s. Damper 409 can receive a current in the range of 0 to 1 amps.

Figure 10:
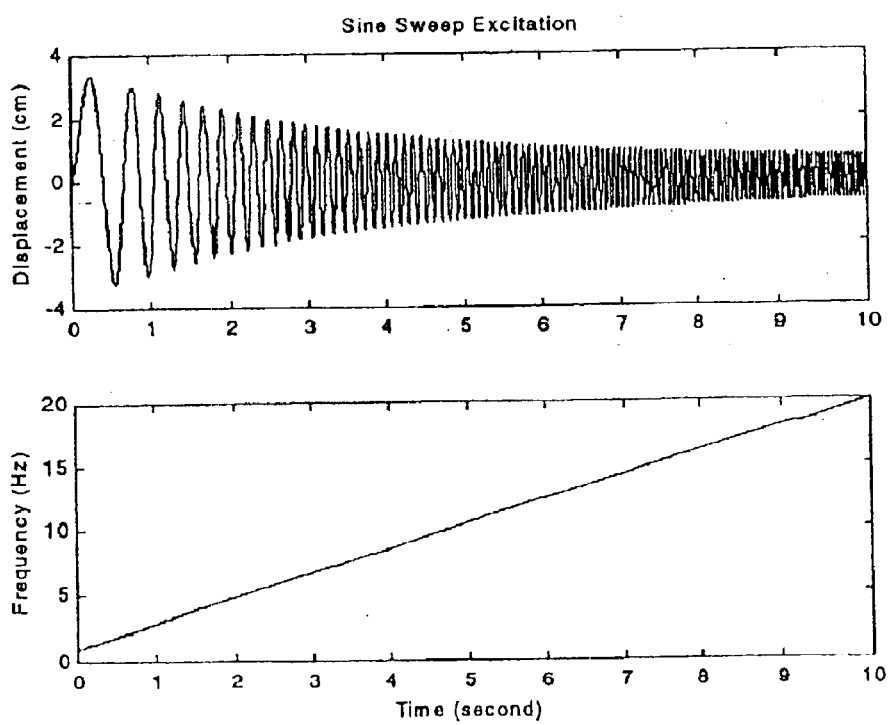
FIG. 10 depicts a graphical illustration of a sine sweep signal of the quarter portion of FIG. 1 according to the present invention.

As shown in FIG. 10, a sine sweep signal of the portion 101 of FIG. 1 depicts the vibration imposed on the wheel 425 at various frequencies and the road roughness over time as wheel 425 traverses the surface 111. As the wheel 425 traverses the surface 111 within a 10 second period the road roughness assumes to decrease while the frequency increases. This sine sweep signal is designed to include suspension vibration from low frequency 0.8 Hz to a high frequency of 20 HZ.

As shown in FIG. 11, the control distribution parameter is depicted as a graphical illustration. Each of the curves in this illustration represents a weighing of force coefficient for the skyhook procedure, hard damping procedure and soft damping procedures for the combined control strategy. For example, the skyhook curve shows that it dominates around the sprung mass mode while in high frequency near the unsprung mass mode hard damping is selected to control the suspension dynamics. The frequency between the sprung mass mode and the unsprung mass mode soft damping plays an important role with the other damping strategies to balance the damping applied to the wheels of the vehicle to minimize the vibration of the wheels keep them stable.

FIGS. 12 to 14 depict graphically illustrations of comparisons of frequency domain control and three single damping control strategies. FIG. 12 shows that the frequency domain control for the sprung mass mode can achieve similar dynamic performance as skyhook control in the sprung mass mode frequency range while frequency domain control dramatically reduces tire acceleration compared to skyhook control especially in the frequency range beyond the sprung mass mode.

FIG. 13 illustrates that the frequency domain control can avoid difficulty of using the soft damping to control the unsprung mass acceleration. In addition, these curves show that frequency domain control can achieve better sprung mass acceleration control than soft damping.

FIG. 14 shows that hard damping can control the unsprung mass acceleration in the wide frequency range at the cost of the sprung mass acceleration control, while the frequency domain control can achieve both. The measurements for hard damping is equivalent with frequency domain control over time versus tire acceleration and sprung mass acceleration. Overall, the frequency domain control can achieve good suspension performance in the wide frequency range. In addition, the frequency domain control takes advantage of each single damping tuning strategy. The curves of the control currents in the FIGS. 12–14 also show the difference of the control strategy. Therefore, this combined strategy is better than any single control strategy in the wide frequency range.

The frequency domain (suspension) control algorithm is composed of the algorithm 600 and the equations described above. The complete control algorithm in the controller 401 was applied to reduce the vibration experienced by both body 400 and wheels (425, 427, 429 and 431) of the vehicle. However, this frequency domain suspension control algorithm can be applied to reduce the amount of noise emitted from noise sources. In the discussion to follow, elements similar to those shown in FIGS. 1–6 are given similar numerals.

Figure 15:
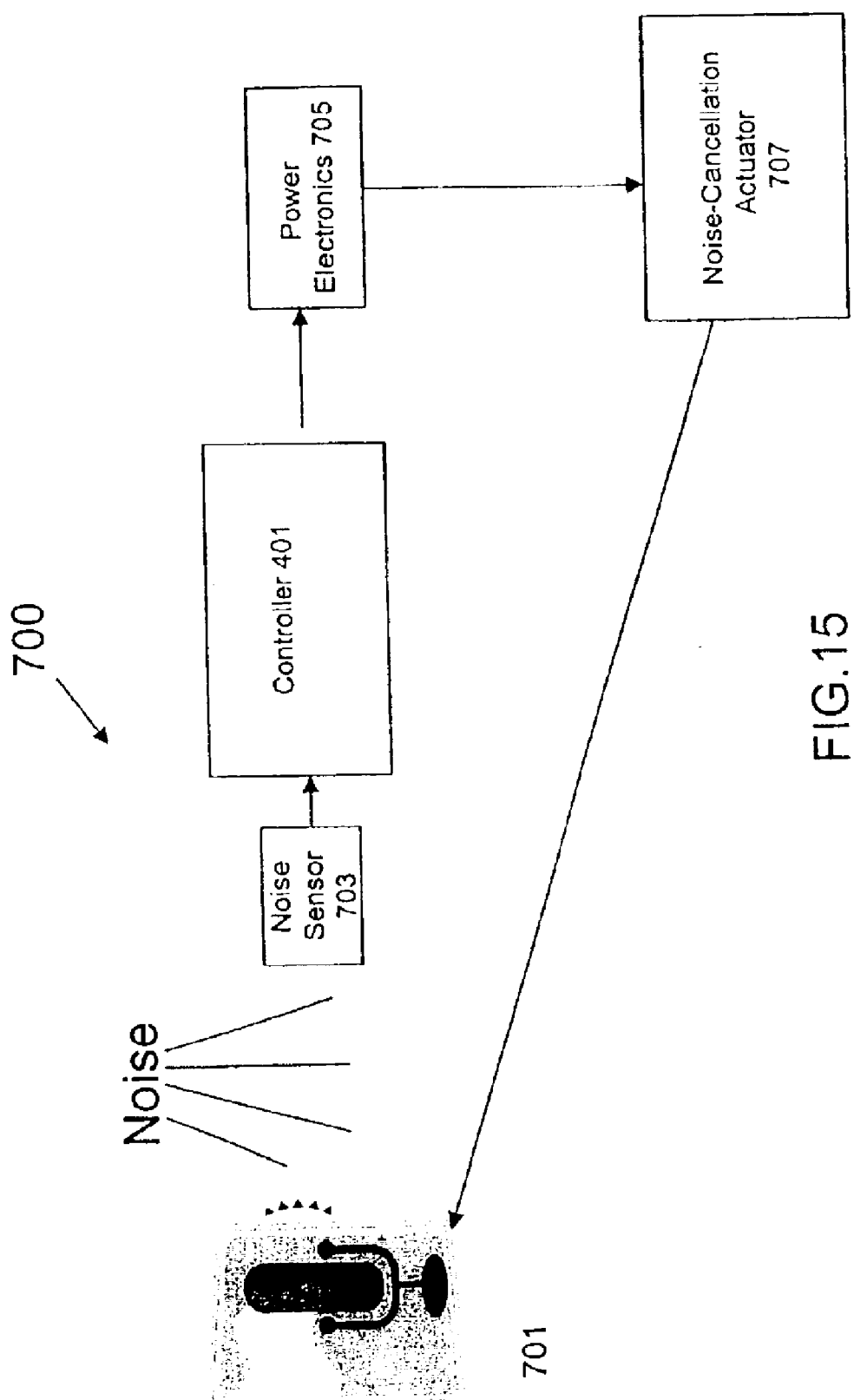
FIG. 15 depicts a block diagram of a noise control system according to another embodiment of the present invention.

For example, FIG. 15 schematically illustrates a noise control system 700 that includes: a microphone 701, a sound sensor 703, the controller 401, power electronics 705 and the noise-cancellation actuator 707. Sound sensor 703 is coupled to controller 401. Controller 401 is coupled to the power electronics 703. Power electronics 705 is coupled to the noise-cancellation actuator 707. In an alternative embodiment, the aforementioned components may be coupled to each other in any suitable combination.

Turning to the operation of the controller 401, processor 701 of the controller receives a sound signal from the sound sensor 703, which senses this sound signal from the microphone 701 while affected from noise sources. The microphone 701 is any typical device that can emit sound waves, such as a radio etc. The sound sensor 703 is located near the microphone 701, which is any typical sensor that can receive, measure or sense the sound wave including noise.

When the controller 401 receives the sound signal from the sound sensor 703, it inputs the sound signal into the frequency domain control algorithm of FIG. 6 in the processor 701 as described above. The washout filter block 601 and washout factor block 603 in the algorithm 600 processes the sound signal in the similar manner as described above to remove signal bias draft from each measured sound signal.

When the sound signal is transmitted through the washout filter block 601, then this sound signal is transmitted to a bandpass filter block 605, which operates in the same manner as described previously with respect to the embodiment of FIGS. 1–6. This bandpass filter block 605, as stated above, receives a selected frequency from selected frequency block 611 with a constant value. The frequencies from the selected frequency block 611 can be chosen from an interested frequency range to cover those most unwanted frequencies or frequency domain, such as frequencies in the range of 3 kHz to 10 KHz. Sound signals at the frequency range of 3 KHz to 10 KHz typically induces hearing loss. This sound signal also refers to any frequency outside of the aforementioned frequency range that can damage the hearing of a person. This frequency range of 3 KHz to 10 KHz is a part of a frequency domain based on the sound signal. The sound signal has a number of specific bandpass (BP) filters designed according to the following equation discussed previously.

When the measured sound signal passes through the bandpass filter block 605, then the frequency range of 3 KHz–10 KHz or frequencies that can induce hearing loss are filtered out or extracted from the sound signal to produce a measured filtered signal. This measured filtered signal can have a frequency range $N_j$ of 1 KHz–3 KHz or any frequency range below 3 KHz that does not induce hearing loss. As stated previously this filtered signal is transmitted to the integrator block 607 and the modal generator block 609. At the integrator block 607, the sound signal is integrated to yield an integrated sound signal value.

Turning to the modal generator block 609, it receives the sound signal from the bandpass filter block 605, an integrated value for the sound signal from the integrator block and the selected frequencies from the frequency block 611. As described above, the modal generator block uses the received information to create frequency information ($\Psi$), for example, according to the following equation:

$$\Psi_j = [(\text{sound signal}/(2\pi N_j))^2 + (\text{sound signal integrated value}^2)]^{1/2}$$

This frequency information ($\Psi$) from the modal generator block is transmitted to the smoothing filter block 613, where the frequency information is filtered out by the smoothing filter block 603 to obtain an amplitude (A) signal by applying a low-pass filter to the frequency information. Smoothing filter block 613 is a separate low pass filter applied to the amplitude signal to remove high frequency components from the amplitude signal. For example, the selected frequencies above 1 KHz that does not induce hearing loss from the selected frequency block 611 is filtered out by the smoothing filter block to obtain an amplitude of a selected frequency, such as 1 kHz.

When the amplitude signal or A is outputted from the processor 701 in the controller 401, this controller uses the amplitude in equations, described above, stored in a software algorithm on the microprocessor 701. The amplitude is used by the microprocessor 701 to derive a control distribution parameter (CDP) according to the equation described above. The value n represents a number from the selected frequency ranges of 1 kHz–3 kHz from the selected frequency block 611.

After the CDP is calculated, then the control strategy is determined for the noise control signal according to the equation described above. The control strategy(i) represents a typical specific noise control strategy that can most effectively control the dynamics in the selected frequency range. For example, if the noise is emitted from a vibrated structure, a damping or stiffness tuning noise control strategy may be applied to control the dynamics in the selected frequency range or reduce the noise. In another example, a microphone may be included in the noise control strategy where the microphone creates a 180 degree out-of-phase sound waves to cancel noise at certain frequencies. For other situations, different actuation systems may be used by applying different strategy(i) to reduce or cancel noise emitted from a noise device. The controls determined by the above approach to reduce the noise in the interested frequency range can simply be combined by using summation or other approaches such as fuzzy logic described above.

When this control strategy is determined, then a signal or a control command is transmitted from the controller 401 to power electronics 705, which instructs or forces the noise-cancellation actuator 707 to reduce or cancel the noise emitted from noise sources. Power electronics 705 are typical power electronics employed to control the operation of the noise-cancellation actuator 707. Noise-cancellation actuator 707 is a typical actuator employed for noise control such as a piezoceramic actuator, vibration isolator, etc.

From the foregoing, it can be seen that the present invention provides an apparatus and method for controlling a vehicle suspension system. In particular, this invention provides a controller that is operative to: receive vehicle body acceleration from the vehicle; calculate heave, pitch and roll (HPR) dynamic signals based on the received vehicle body acceleration; select frequency ranges based on the dynamic signals to be controlled; calculate a combined control strategy based on the selected frequency ranges; and adjust a damper of the vehicle based on the control strategy. Based on the control strategy, the controller is able to adjust the wheels of the vehicle in the appropriate manner to minimize the vibration of the wheels, which stabilizes a suspension system of the vehicle. Therefore, this invention provides the advantage of being able to minimize the vibration of the wheels and the vehicle body as the wheels vibrate at any frequency, so the suspension system is stable during driving conditions and the ride performance of the vehicle is improved. In addition, this invention provides the advantage of being able to reduce the amount of noise being emitted from a noise device, which prevents people from suffering from hearing loss.

It is therefore intended that the foregoing detailed description be regarded as illustrative rather than limiting, and that it be understood that it is the following claims, including all equivalents, that are intended to define the spirit and scope of this invention.

I claim:

1. A frequency domain suspension control system, the system comprising:
    a controller;
    an accelerometer coupled to the controller, wherein the accelerometer is operative to transmit a body acceleration to the controller;
    a damper coupled to the controller and a vehicle; and
    wherein the controller is operative to receive the body acceleration, calculate heave, pitch and roll dynamic signals in response to receiving the body acceleration for the damper, select frequency ranges based on the heave, pitch and roll dynamic signals to be controlled, calculate a combined control strategy based on the selected frequency ranges and adjust the damper of the vehicle based on the combined control strategy.

2. The system of claim 1 wherein the damper comprises a continuously variable damper.

3. The system of claim 1 wherein the damper comprises a shock absorber.

4. The system of claim 1 wherein the controller is operative to calculate an amplitude signal based on the selected frequency ranges to adjust the damper.

5. The system of claim 4 wherein the controller is operative to calculate a control distribution parameter based on the amplitude signal.

6. The system of claim 4 wherein the control distribution parameter is calculated in accordance with the following equation:

$$\text{Control distribution parameter } \lambda_{ij} = \frac{A_{ij}}{\varepsilon + \sum_{j=1}^{3} A_{ij}}$$

where $\varepsilon$ comprises 0.001, where j comprises a frequency from the selected frequency ranges, where i comprises heave, pitch and roll measurements, where $A_{ij}$ comprises the Amplitude signal.

7. The system of claim 6, wherein the control strategy is calculated in accordance with the following equation:

$$\text{Control} = \sum_{i=1}^{3} \sum_{j=1}^{3} (\lambda_{ij} \cdot \text{Strategy}(i, j))$$

where strategy (i,j) comprises specific control strategies that can effectively control the dynamics in the selected frequency ranges, where $\lambda_{ij}$ comprises the control distribution parameter.

8. A method for utilizing frequency domain information to control a vehicle suspension system, the method comprising:
   receiving a body acceleration from a vehicle;
   calculating heave, pitch and roll (HPR) dynamic signals based on the received body acceleration;
   selecting frequency ranges based on the HPR dynamic signals to be controlled;
   calculating a control distribution parameter based on the selected frequency ranges;
   calculating a combined control strategy based on the control distribution parameter; and
   adjusting a damper of the vehicle based on the combined control strategy.

9. The method of claim 8 wherein receiving a body acceleration is received from an RC anti-aliasing filter.

10. The method of claim 9 wherein receiving the body acceleration from the RC anti-aliasing filter further comprises receiving measurements from an accelerometer.

11. The method of claim 8 further comprises applying a high pass filter to the body acceleration to remove low frequency components from the HPR dynamic signals.

12. The method of claim 11 wherein the low frequency components are direct current components.

13. An apparatus for utilizing frequency domain information to control a vehicle suspension system, the apparatus comprising:
   means for receiving a body acceleration from a vehicle;
   means for calculating heave, pitch and roll (HPR) dynamic signals based on the received body acceleration;
   means for selecting frequency ranges based on the HPR dynamic signals to be controlled;
   means for calculating a combined control strategy based on the selected frequency ranges; and
   means for adjusting a damper of the vehicle based on the combined control strategy.

14. A frequency domain suspension control system, the system comprising:
   a controller;
   a plurality of accelerometers and a plurality of sensors coupled to the controller, wherein the plurality of accelerometers are operative to transmit body accelerations, wherein the plurality of sensors are operative to transmit damper dynamic signals to the controller;
   a damper coupled to the controller and a vehicle; and
   wherein the controller is operative to receive the body accelerations and the damper signals, calculate heave, pitch and roll dynamic signals in response to receiving the body accelerations, select frequency ranges based on the heave, pitch and roll dynamic signals to be controlled, calculate a combined control strategy based on the selected frequency ranges and adjust the damper of the vehicle based on the combined control strategy.

15. A frequency domain suspension control system, the system comprising:
   a controller;
   a plurality of accelerometers coupled to the controller, wherein the plurality of accelerometers are operative to transmit body accelerations to the controller;
   a damper coupled to the controller and a vehicle; and
   wherein the controller is operative to receive the body accelerations, calculate heave, pitch and roll dynamic signals in response to receiving the body accelerations for the damper, select the frequency ranges based on the heave, pitch and roll dynamic signals to be controlled, calculate control distribution parameters based on the selected frequency ranges, calculate a combined control strategy based on the control distribution parameters and adjust the damper of the vehicle based on the combined control strategy.

* * * * *